United States Patent Office 3,660,423
Patented May 2, 1972

3,660,423
2-(SUBSTITUTED BENZYL)METHYL-
2-IMIDAZOLINES
Don V. Wysong, Midland, Mich., and Halbert C. White, Indianapolis, Ind., assignors to The Dow Chemical Company, Midland, Mich.
No Drawing. Filed Feb. 13, 1970, Ser. No. 11,286
Int. Cl. C07d 49/34
U.S. Cl. 260—309.6       5 Claims

ABSTRACT OF THE DISCLOSURE 2-(substituted benzyl)-2-imidazoline compounds such as 2-(4-amino-3-chlorobenzyl)-2-imidazoline, and their pharmaceutically-acceptable salts such as the mono- and dihydrochlorides are prepared by classical procedures. The compounds are active as antidepressants.

---

This invention is concerned with haloarylimidazolines and is particularly directed to 2-(halobenzyl)-2-imidazoline and the pharmaceutically-acceptable salts thereof, the imidazoline compounds corresponding to the formula:

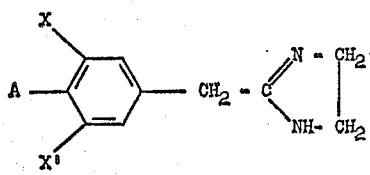

In the present specification and claims, A represents acetamido or amino, X represents chlorine or bromine and X' represents hydrogen, chlorine or bromine. The term "pharmaceutically-acceptable salt" as herein employed refers to non-toxic salts of the halobenzylimidazolines. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or citric acid or with organic sulfonic acids such as methanesulfonic or p-toluenesulfonic acid. The compounds are crystalline solids which are of varying degrees of solubility in organic solvents such as 1,2-dichlorobenzene, methylene chloride, diethyl ether and alcohols and are only slightly soluble in water. The pharmaceutically-acceptable salts of the novel compounds such as 2-(4-amino-3,5-dichlorobenzyl)-2-imidazoline dihydrochloride are soluble in water and slightly soluble in organic solvents such as acetone, benzene and alcohols.

The compounds corresponding to the above formula are useful for administration to laboratory animals in studying the behavior thereof and in studying drug effects on the central and peripheral nervous systems, and are particularly useful as antidepressants. The compounds wherein A is amino and X' is hydrogen are the preferred compounds for antidepressant use. For such uses, the preferred form of the halobenzylimidazoline compounds is a pharmaceutically-acceptable salt thereof and the compounds are preferably employed in the form of their dihydrochloride salts. The compounds wherein A is acetamido are useful as intermediates in the preparation of the compounds wherein A is amino. The intermediates are preferably employed as the hydrochloride salts. Other salts, and particularly the tosylate (p-toluenesulfonate), can also be used in the preparation and purification of the compounds, and can be converted to the preferred hydrochloride salts.

The compounds of the invention wherein A is acetamido are prepared by the reaction of a substituted phenylacetonitrile or a substituted phenylacetic acid with ethylenediamine p-toluenesulfonate to form an acetamidohalobenzylimidazoline p-toluenesulfonate salt, and the subsequent hydrolysis of such p-toluenesulfonate salt in aqueous base to liberate the compound as a free base. The substituted phenylacetonitrile starting materials can be prepared by known procedures, for example, by mixing a substituted α-halotoluene such as α,3-dichloro-4-acetamido toluene and sodium cyanide in an inert organic solvent, such as ethanol, and heating the mixture at a temperature of about 70°–90° C. for about 0.5–8 hours. The substituted phenylacetonitrile can be separated by diluting the mixture with water, followed by extraction with methylene chloride and evaporation of the methylene chloride extract.

The reaction proceeds with the evolution of ammonia when a substituted phenylacetonitrile and the ethylenediamine p-toluenesulfonate are mixed together, or with the evolution of water when a substituted phenylacetic acid is employed as a reactant, and is preferably carried out in an inert organic solvent as a reaction medium. Representative and suitable inert organic solvents which can be employed as reaction media include alkyl benzenes such as o, m, and p-xylene, and halobenzenes such as 1,2-dichlorobenzene. When a substituted phenylacetonitrile is employed as a reactant the reaction is preferably carried out under an inert atmosphere by passing nitrogen through the mixture to carry off ammonia of reaction. The reaction proceeds readily at temperatures from about 150° C. to the boiling temperature of the mixture and is preferably carried out under reflux at the boiling temperature of the reaction mixture. The acetamidohalobenzylimidazoline product precipitates in the reaction mixture as its p-toluenesulfonate salt, and the salt can be separated by conventional methods as filtration, centrifugation, decantation or extraction with water. The free base product can be obtained by neutralization of the salt in aqueous base. The free base acetamidohalobenzylimidazoline is then separated by extraction with an organic solvent such as methylene chloride or chloroform, followed by evaporation of the solvent. The product can be purified by conventional methods such as recrystallization, or it can be converted to a pharmaceutically-acceptable salt.

The compounds of the invention wherein A is amino are prepared by the hydrolysis of the compounds wherein A is acetamido. The hydrolysis is carried out in an aqueous medium containing excess acid, generally at least about 2 molar proportions of acid being employed for each molar proportion of starting material. The acid employed is preferably one which is capable of forming a pharmaceutically-acceptable salt with the aminohalobenzylimidazoline compound. The reaction proceeds when a compound corresponding to the above formula wherein A is acetamido is mixed with excess aqueous acid, preferably hydrochloric acid. The reaction is generally complete in about 1 to 3 hours at temperatures from about 90° to about 120° C. or in 3 to 12 to 24 hours at temperatures from about 10° to 90° C. The product is obtained in the reaction mixture as a salt of the acid employed and can be separated by conventional procedures such as filtration and washing. The product can be further purified by conventional methods such as recrystallization, or it can be converted to the free base or to another pharmaceutically-acceptable salt.

The pharmaceutically-acceptable salts of the imidazoline compounds of the invention can be prepared by dissolving the free base in a minimal amount of alcohol or ether and adding an alcoholic or ethereal solution of an acid such as hydrochloric acid, hydrobromic acid, malic acid, maleic acid or succinic acid or the like until precipitation of the corresponding salt is complete. In the case of the compounds wherein A is amino the mono-acid salt can be prepared by adding one molar equivalent of acid. The diacid salt can be similarly prepared by using at least two molar equivalents of acid for each equivalent of free base. The salt can further be purified by recrystallization or converted to the free base by hydrolysis.

The free base imidazoline compound can be prepared by neutralization of the salt in aqueous base. In a convenient procedure, the salt is mixed with excess sodium hydroxide in aqueous solution, after which the free base can be separated by extraction with a chlorinated hydrocarbon solvent. The solvent can be removed by conventional methods such as evaporation or distillation and the free base compound can be purified by methods such as recrystallization.

In preparing the compounds of the invention, wherein A is acetamido, a substituted phenylacetonitrile or a substituted phenylacetic acid is mixed together with ethylenediamine p-toluenesulfonate and an inert organic solvent, preferably 1,2-dichlorobenzene. The exact proportions of the reactants to be employed are not critical, some of the desired product being obtained when the reactants are combined in any proportions. However, the reaction consumes the reactants in equimolar proportions and the use of the reactants in such proportions or with an excess of the ethylenediamine monotosylate reactant is preferred. The mixture is heated at a temperature within the reaction temperature range for about 1 to 10 hours. In a convenient procedure, when a substituted phenylacetonitrile is employed, the reaction vessel is vented to a trap containing aqueous hydrochloric acid to react with the ammonia of reaction and a nitrogen purge is employed. The reaction mixture is then cooled and extracted with water. When a substituted phenylacetic acid is employed, the reaction vessel is preferably vented to a water trap. The acetamidohalobenzylimidazoline p-toluenesulfonate in the aqueous extract can be separated by evaporation and purified by recrystallization or it can be converted to the free base by neutralization on addition of sodium hydroxide to the extract and then hydrolyzed with acid to prepare an aminohalobenzylimidazoline.

In preparing the compounds wherein A is amino, an acetamidohalobenzylimidazoline of the invention is conveniently mixed with an excess of aqueous hydrochloric acid and the mixture is held for about 0.5 to 3 hours at a temperature of 90° to 120° C. The product is obtained as the dihydrochloride salt which is conveniently separated by filtration. The product can be further purified or it can be converted to the free base by neutralization in aqueous base.

The following examples illustrate the invention but are not to be construed as limiting the same.

EXAMPLE 1

4 - acetamido-3-chlorophenylacetic acid (22.75 grams; 0.1 mole), ethylenediamine p-toluenesulfonate (23.3 grams; 0.1 mole) and 100 milliliters of 1,2-dichlorobenzene are mixed together in a vessel vented to a water trap. The mixture is heated at the boiling temperature under reflux for about 3 hours. The reaction mixture is cooled and the solvent is decanted off to obtain 2-(4-acetamido-3-chlorobenzyl)-2-imidazoline p-toluenesulfonate, having a molecular weight of 424 as a residue. The 2-(4-acetamido-3-chlorobenzyl)-2-imidazoline p-toluenesulfonate is taken up in a mixture of methylene chloride and water. The mixture is made basic (pH 10-12) by the addition of aqueous 5 normal sodium hydroxide. The methylene chloride layer is separated to obtain the 2-(4-acetamido-3-chlorobenzyl)-2-imidazoline as a solution of the free base in methylene chloride. The methylene chloride extract is evaporated under reduced pressure to obtain the 2-(4-acetamido-3-chlorobenzyl)-2-imidazoline product as a solid residue.

The 2-(4-acetamido-3-chlorobenzyl)-2-imidazoline free base is dissolved in isopropanol and excess hydrogen chloride is added in isopropanol until precipitation is complete. The mixture is held for about 18 hours at room temperature, then filtered. The filter cake is recrystallized from ethanol, washed with diethyl ether and dried. The 2-(4-amino-3-chlorobenzyl) - 2 - imidazoline dihydrochloride product is found to melt at 227°–229° C. The mixture of the product is confirmed by nuclear magnetic resonance analysis and by infrared spectroscopy.

In substantially the same procedure described above and employing similar inert organic solvents, 2-(4-amino-3,5-dichlorobenzyl)-2-imidazoline dihydrochloride, having a molecular weight of 333, is prepared by employing 4-acetamido-3,5-dichlorophenylacetic acid in lieu of the 4-acetamido - 3 - chlorophenylacetic acid in the procedure described above.

In substantially the same procedure described above and employing similar inert organic solvents but substituting for the 4-acetamido-3-chlorophenylacetic acid, an appropriate substituted phenylacetic acid the following imidazoline compound is formed.

2-(4-amino-3,5-dibromobenzyl)-2-imidazoline dihydrochloride, having a molecular weight of 406, is prepared by substituting 4-acetamido-3,5-dibromophenylacetic acid for 4 - acetamido-3-chlorophenylacetic acid in the above-described procedure.

EXAMPLE 2

4-acetamido - 3 - bromophenyl acetonitrile (8.0 grams; 0.03 mole), ethylenediamine p-toluenesulfonate (14.7 grams; 0.06 mole) and 50 milliliters of 1,2-dichlorobenzene are mixed together in a vessel vented to a trap containing aqueous hydrogen chloride. Nitrogen is passed through the mixture to carry off ammonia of reaction while the mixture is heated at the boiling temperature under reflux for about 2 hours. The mixture is cooled, 15 milliliters of aqueous 12 Normal hydrochloric acid and 50 milliliters of water are added, and the organic layer is decanted off. The aqueous layer is made basic (pH 10–12) by the addition of aqueous sodium hydroxide, and extracted with methylene chloride. The methylene chloride extract is treated with activated carbon, filtered and evaporated to obtain the 2-(4-acetamido-3-bromobenzyl)-2-imidazoline.

The 2-(4-acetamido-3-bromobenzyl)-2-imidazoline free base is taken up in 50 milliliters of aqueous 5 Normal hydrogen chloride and heated at the boiling temperature under reflux for 3 hours. The mixture is evaporated, and the residue is taken up in a minimal amount of water, made basic by the addition of aqueous sodium hydroxide and extracted with methylene chloride. The methylene chloride extract is evaporated to obtain the 2-(4-amino-3-bromobenzyl)-2-imidazoline product as an oil which crystallizes on standing. The structure of the product is confirmed by nuclear magnetic resonance analysis.

The 2-(4-amino-3-bromobenzyl)-2-imidazoline free base is dissolved in dimethoxyethane and isopropanol and excess ethereal hydrogen chloride is added until precipitation is complete. The 2-(4-amino-3-bromobenzyl)-2-imidazoline dihydrochloride product is separated by filtration, dried and found to melt at 224°–226° C. The structure of the product is confirmed by nuclear magnetic resonance analysis and by infrared spectroscopy.

Antidepressant activity of the new compounds is indicated by antagonism of reserpine-induced depression in mice. In representative operations, separate imidazoline compounds are administered to separate groups of mice at various dosage rates by intraperitoneal injection. 0.5 hour after the administration of the imidazoline compound, reserpine is administered to each mouse at a dosage rate of 5 milligrams per kilogram by intraperitoneal injection. The administration of 5 milligrams per kilogram of reserpine intraperitoneally to untreated mice results in a progression of signs starting with drooping of the eyelids (ptosis) and pilo-erection and culminating in a generalized depression with decreased spontaneous motor activity and decreased responsiveness to auditory or tactile stimuli. Following the administration of the reserpine, the test animals are observed for the above signs of depression. Inhibition of reserpine depression is indicated when the mice are observed to exhibit no ptosis, normal spontaneous motor activity and normal responsiveness to stimuli. The dosage of representative imidazoline compounds effective to inhibit reserpine depression in 50 percent of the mice ($ED_{50}$) is calculated. 2-(4-amino-3-chlorobenzyl)-2-imidazoline dihydrochloride is found to have an $ED_{50}$ of 0.25 milligram per kilogram. 2 - (4-amino-3-bromobenzyl)-2-imidazoline dihydrochloride is found to have an $ED_{50}$ of 1.9 milligrams per kilogram. In other operations, 2-(4-amino-3-chlorobenzyl)-2-imidazoline dihydrochloride and 2 - (4-amino-3-bromobenzyl)-2-imidazoline dihydrochloride are found to have $LD_{50}$'s in mice of 83 and 68, respectively, milligrams per kilogram by intraperitoneal injection.

What is claimed is:

1. A member of the group of compounds corresponding to the formula

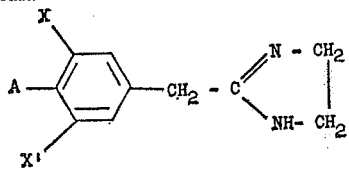

wherein A represents a member of the group consisting of acetamido and amino, X represents a member of the group consisting of chlorine and bromine and X' represents a member of the group consisting of hydrogen, chlorine and bromine, and the pharmaceutically-acceptable salts thereof with the proviso that when X represents chlorine, A represents acetamido.

2. A compound of claim 1 wherein A represents acetamido.

3. A compound of claim 1 wherein X represents bromine.

4. The compound of claim 1 wherein the compound is 2-(4-amino-3-bromobenzyl)-2-imidazoline.

5. The compound of claim 1 wherein the compound is 2 - (4-amino-3-bromobenzyl)-2-imidazoline dihydrochloride.

References Cited

UNITED STATES PATENTS 2,505,247  4/1950  Isler _____ 260—309.6
3,449,357  6/1969  White _____ 260—309.6

OTHER REFERENCES

Cavallini et al.; Chem. Abst., vol. 53, columns 8125–6 (1959).

Faust et al.; J. Org. Chem., vol. 26, pages 4044–7 (1961).

Oxley et al.; J. Chem. Soc. (London), 1947, pages 497–505.

NATALIE TROUSOF, Primary Examiner

U.S. Cl. X.R.

260—465 D, 518 A; 424—273

PO-1050
(5/69)

UNITED STATES PATENT OFFICE
CERTIFICATE OF CORRECTION

Patent No.     3,660,423          Dated    2 May 1972

Inventor(s)     Don V. Wysong and Halbert C. White

It is certified that error appears in the above-identified patent and that said Letters Patent are hereby corrected as shown below:

Column 4, line 6, delete "mixture" and insert --structure--.

Signed and sealed this 10th day of October 1972.

(SEAL)
Attest:

EDWARD M. FLETCHER, JR.          ROBERT GOTTSCHALK
Attesting Officer                Commissioner of Patents